(12) United States Patent
Kim et al.

(10) Patent No.: US 8,065,055 B2
(45) Date of Patent: Nov. 22, 2011

(54) SHOCK ABSORBER FOR CONTROLLING DAMPING FORCE CHARACTERISTICS

(75) Inventors: Hong Sig Kim, Iksan-si (KR); Sung Min Kim, Iksan-si (KR)

(73) Assignee: Mando Corporation, Gyeonggi-do (KR)

( * ) Notice: Subject to any disclaimer, the term of this patent is extended or adjusted under 35 U.S.C. 154(b) by 400 days.

(21) Appl. No.: 12/276,160

(22) Filed: Nov. 21, 2008

(65) Prior Publication Data
US 2009/0132122 A1    May 21, 2009

(30) Foreign Application Priority Data
Nov. 21, 2007  (KR) .................. 10-2007-0119075
Apr. 8, 2008   (KR) .................. 10-2008-0032828

(51) Int. Cl.
*B60G 17/018* (2006.01)
(52) U.S. Cl. ....... 701/37; 267/2; 280/5.515; 280/124.16
(58) Field of Classification Search .................. 701/37; 267/2, 64.11; 280/5.515, 124.101, 124.157, 280/124.16, 124.161
See application file for complete search history.

(56) References Cited

U.S. PATENT DOCUMENTS
5,360,089 A    11/1994  Nakamura et al.

FOREIGN PATENT DOCUMENTS
| JP | 57177439 A | 11/1982 |
|----|------------|---------|
| JP | 58081244 A | 5/1983  |
| JP | 5278431 A  | 10/1993 |
| JP | 5302638 A  | 11/1993 |
| JP | 6280921 A  | 10/1994 |

*Primary Examiner* — Eric Culbreth
(74) *Attorney, Agent, or Firm* — McDermott Will & Emery LLP

(57) ABSTRACT

Disclosed herein is a shock absorber capable of controlling damping force characteristics. The shock absorber includes a cylinder filled with an operating fluid, a piston valve disposed inside the cylinder to divide an interior of the cylinder into a first chamber and a second chamber, a piston rod having one end extending outside the cylinder and the other end coupled to the piston valve inside the cylinder, a hollow chamber formed inside the piston rod to communicate with the first and second chambers, a free piston disposed within the hollow chamber to move up and down and to divide the hollow chamber into upper and lower chambers, and a variable part configured to control the damping force characteristics by adjusting a vertical displacement of the free piston.

6 Claims, 7 Drawing Sheets

SHOCK ABSORBER FOR CONTROLLING DAMPING FORCE CHARACTERISTICS

BACKGROUND

1. Technical Field

The present invention relates to a shock absorber for damping vibration transmitted to a vehicle according to a road state and, more particularly, to a shock absorber for controlling damping force characteristics by means of a hollow chamber formed inside a piston rod.

2. Description of the Related Art

Generally, a vehicle is provided with a suspension system for enhancing driving comfort by buffering impact or vibration transmitted to an axle from a road during driving. One of the components constituting the suspension system is a shock absorber. The shock absorber is typically disposed between the axle and a vehicle body. The shock absorber includes a cylinder and a piston rod reciprocating inside the cylinder. The cylinder is filled with an operating fluid, such as gas or oil, such that the operating fluid is moved by a piston valve secured to one end of the piston rod to generate a damping force.

A conventional shock absorber has a restriction in that it exhibits constant damping force characteristics with respect to variation of a road state or a driving posture of the vehicle. In other words, as determined in a manufacturing stage, a low (smooth) damping force characteristic can improve driving comfort of the vehicle, but cannot maintain a stable posture thereof. Conversely, a high (rigid) damping force characteristic can maintain the stable posture of the vehicle, but entails deterioration of the driving comfort. As such, the conventional shock absorber is incapable of controlling damping force characteristics in response to variation of the road state or the posture of the vehicle.

Accordingly, in order to solve the problem of such a conventional shock absorber, a shock absorber capable of providing variable damping force characteristics according to a displacement of the piston rod has been developed.

FIG. 1 is a partial cross-sectional view of a conventional shock absorber capable of providing variable damping force characteristics. Referring to FIG. 1, the shock absorber 10 includes a piston rod 14 connected to a vehicle body, and a cylinder 12 secured to an axle connected to wheels. The piston rod 14 reciprocates within the cylinder 12.

The piston rod 14 includes a piston valve 16 disposed at a lower end of the piston rod 14 to divide a space of the cylinder 12 into a rebound chamber RC and a compression chamber CC. The piston valve 16 is formed with a rebound passage 16a and a compression passage 16b through which the rebound chamber RC and the compression chamber CC fluidly communicate with each other. The shock absorber 10 further includes discs 18a and 18b disposed on upper and lower sides of the rebound passage 16a and the compression passage 16b to resiliently deform and generate a damping force according to movement of an operating fluid.

The piston rod 14 has a hollow chamber 20 formed therein. The hollow chamber 20 is provided with a free piston 22 that can move up and down and divides the hollow chamber 20 into an upper chamber 20a and a lower chamber 20b. An upper portion of the upper chamber 20a is in fluid communication with the rebound chamber RC through a through-hole 24, and a lower portion of the lower chamber 20b is in fluid communication with the compression chamber CC through a shaft hole 25.

As the piston rod 14 is slightly displaced, the free piston 22 is lifted or lowered, and the operating fluid flows into or from the hollow chamber 20 through the through-hole 24 or the shaft hole 25. As a result, the damping force characteristics of the shock absorber 10 are varied.

Referring to FIG. 2, Curve X1 indicates variation of the damping force of a general shock absorber which cannot control the damping force characteristics, and Curve X2 indicates variation of the damping force of the conventional shock absorber 10 capable of providing a responsive damping force. As shown in this plot, the conventional shock absorber 10 provides the damping force as indicated by Curve X2 according to the volume of the hollow chamber 20, that is, a range of motion of the free piston 22.

However, since the conventional shock absorber adopts a mechanical structure for buffering the impact or vibration, it is not effective in controlling the damping force and has a limited performance of varying the damping force.

BRIEF SUMMARY

Embodiments of the present invention are directed toward solving the problems of the conventional techniques as described above, and an aspect of the present invention is to provide a shock absorber capable of electronically controlling damping force characteristics according to a road state.

In accordance with an aspect of the present invention, a shock absorber capable of controlling damping force characteristics is provided. The shock absorber includes: a cylinder filled with an operating fluid; a piston valve disposed inside the cylinder to divide an interior of the cylinder into a first chamber and a second chamber; a piston rod having one end extending outside the cylinder and the other end coupled to the piston valve inside the cylinder; a hollow chamber formed inside the piston rod to fluidly communicate with the first and second chambers; a free piston disposed within the hollow chamber to move up and down and to divide the hollow chamber into upper and lower chambers; and a variable part configured to control the damping force characteristics by adjusting a vertical displacement of the free piston.

The variable part may include a control rod moving up and down within the hollow chamber to control a range of motion of the free piston, and an actuator configured to move the control rod up and down.

The upper chamber may communicate with the first chamber through a through-hole formed at an upper portion of the hollow chamber, and the lower chamber may communicate with the second chamber through a shaft hole formed at a lower portion of the hollow chamber.

The variable part may further include a control valve provided to a distal end of the control rod and moving up and down along with the control rod while closely contacting an inner circumferential surface of the hollow chamber.

The control valve may be formed with a bypass passage through which upper and lower portions of the control valve fluidly communicate with each other.

In accordance with another aspect of the present invention, a suspension system for buffering vibration transmitted from a road to a vehicle body through wheels during driving on the road is provided. The suspension system includes a shock absorber, the shock absorber including a hollow chamber formed inside a piston rod, a free piston disposed within the hollow chamber to move up and down and to divide the hollow chamber into upper and lower chambers, and a variable part configured to change the damping force characteristics by controlling a vertical displacement of the free piston; a sensor for detecting a state of the road; and a controller configured to drive the variable part of the shock absorber based on a measurement value of the sensor.

The sensor may be an acceleration sensor provided to a cylinder side of the shock absorber or to a wheel side.

The controller may control the variable part to reduce a displacement of the free piston if the measurement value of the sensor is high and to increase the displacement of the free piston if the measurement value of the sensor is low.

BRIEF DESCRIPTION OF THE SEVERAL VIEWS OF THE DRAWINGS

The above and other features and advantages will become apparent from the following description of some embodiments given in conjunction with the accompanying drawings, in which.

DETAILED DESCRIPTION

Figure 3:
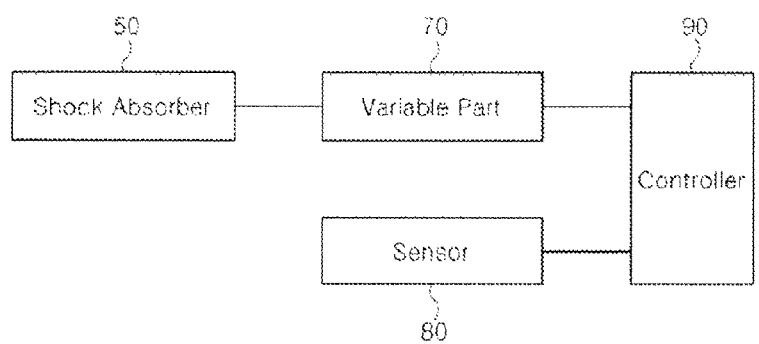
FIG. 3 is a diagram of a suspension system including a shock absorber according to one embodiment.

FIG. 3 is a diagram of a suspension system including a shock absorber according to one embodiment. In FIG. 3, the suspension system according to the invention includes a shock absorber 50, a variable part 70 disposed in the shock absorber 50 to vary damping force characteristics according to a displacement of a piston rod, and a controller 90 which controls operation of the variable part 70. The controller 90 is connected with a sensor 80 such as an acceleration sensor for measuring an upward or downward acceleration of a vehicle, and controls the operation of the variable part 70 based on a measurement value of the sensor 80.

Such a shock absorber 50 capable of varying the damping force characteristics according to the displacement of the piston rod is also referred to as a "frequency-responsive shock absorber."

Next, a shock absorber according to one embodiment will be described in detail with reference to FIGS. 4 to 7.

Figure 4:
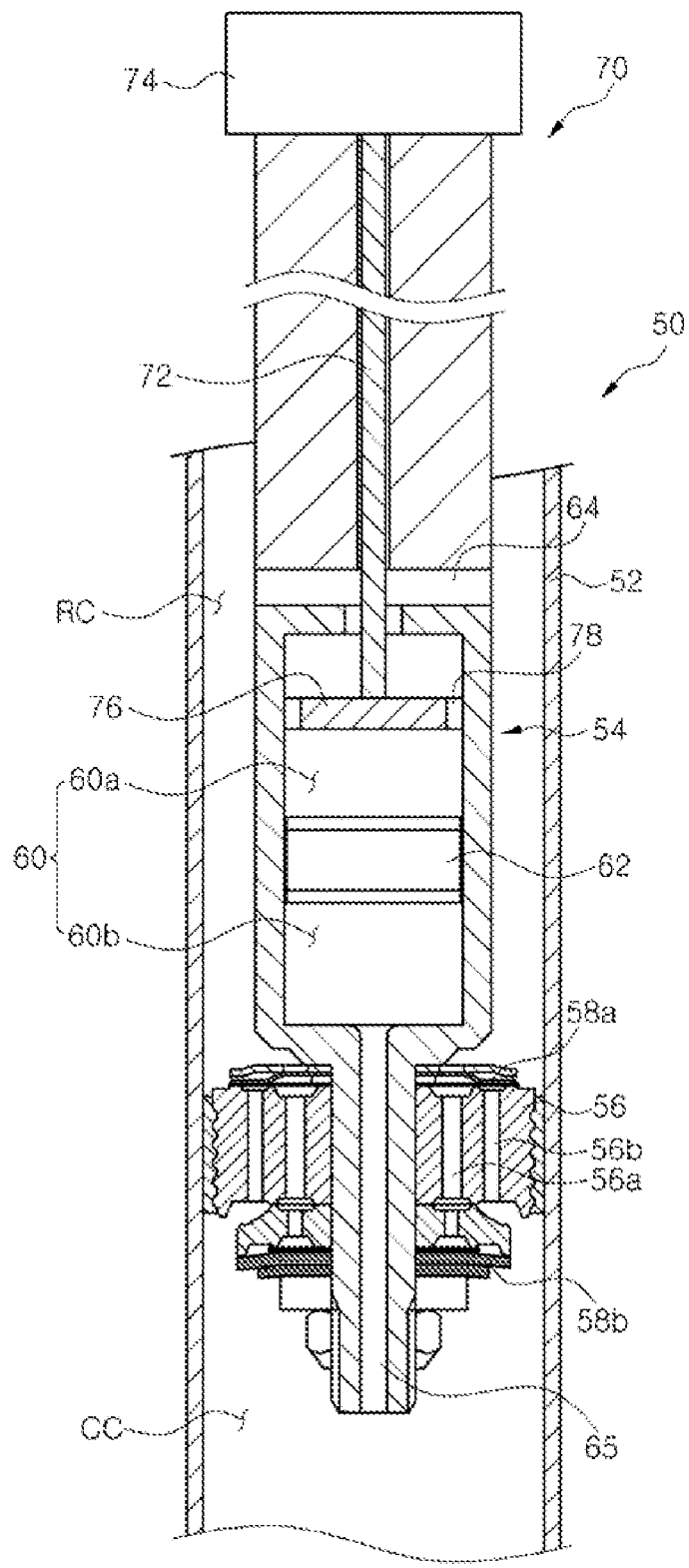
FIG. 4 is a partial cross-sectional view of a shock absorber according to one embodiment.

FIG. 4 is a partial cross-sectional view of the shock absorber 50 according to one embodiment. Referring to FIG. 4, the shock absorber 50 includes a cylinder 52 connected to a wheel side of the vehicle, and a piston rod 54 connected to a vehicle body side. The piston rod 54 is disposed inside the cylinder 52 to reciprocate therein and includes a piston valve 56 disposed at one end of the piston rod 54 to divide the interior of the cylinder 52 into a compression chamber and a rebound chamber. The piston valve 56 is formed with a rebound passage 56a and a compression passage 56b through which the rebound chamber fluidly communicates with the compression chamber. Further, a plurality of discs 58a and 58b are disposed on upper and lower surfaces of the piston valve 56 to resiliently deform and generate a damping force according to movement of an operating fluid.

The piston rod 54 has a hollow chamber 60 formed therein. The hollow chamber 60 is provided with a free piston 62 that can move up and down therein. Here, the free piston 62 moves in the hollow chamber 60, with an outer circumferential surface of the free piston 62 contacting an inner circumferential surface of the hollow chamber 60, and divides the hollow chamber 60 into upper and lower chambers 60a and 60b. The free piston 62 may be provided on the outer circumference thereof with a finishing member, such as Teflon resin, which can reduce friction with respect to the inner wall of the hollow chamber 60.

Further, the shock absorber 50 includes the variable part 70 which controls the damping force characteristics by adjusting the volume of the hollow chamber 60, that is, a range of motion of the free piston 62.

The variable part 70 may be provided to one of the upper chamber 60a and the lower chamber 60b. In this embodiment, the variable part 70 is provided to the upper chamber 60a. The variable part 70 includes a control rod 72 penetrating the center of the piston rod 54, and an actuator 74 disposed at an upper part of the piston rod 54 to move the control rod 72 up and down. One end of the control rod 72 is located inside the hollow chamber 60 to contact an upper part of the free piston 62. As a result, the movement of the free piston 62 is restricted by the control rod 72.

On the other hand, the control rod 72 may be further provided at the other end thereof with a control valve 76 which divides the upper chamber 60a into an upper portion and a lower portion. The control valve 76 closely contacts an inner circumferential surface of the hollow chamber 60, that is, the inner circumferential surface of the upper chamber 60a in which the control valve 76 is disposed. The control valve 76 may be formed with a bypass passage through which the upper and lower portions of the upper chamber 60a communicate with each other. The control valve 76 moves along with the control rod 72 and serves to increase or decrease the volume of the hollow chamber 60, that is, the range of motion of the free piston 62.

The hollow chamber 60 is formed with a first passage connected to the upper portion of the upper chamber 60a through a through-hole 64 fluidly communicating with the rebound chamber RC and a bypass passage 78 of the control valve 76. The hollow chamber 60 is also formed with a second passage as defined by a shaft hole 65 located at a lower portion of the lower chamber 60b to communicate with the compression chamber CC.

As such, in the shock absorber 50, the free piston 62 is moved up or down by the fluid flowing into or from the hollow chamber 60 and the rebound chamber RC or flowing into or from the hollow chamber 60 and the compression chamber CC through the first passage or the second passage.

In more detail, when the free piston 62 moves upward, the fluid in the upper chamber 60a of the hollow chamber 60 flows into the rebound chamber RC through the first passage, and, as a space is formed in the lower chamber 60b by the upward movement of the free piston 62, the fluid in the compression chamber CC flows into the lower chamber 60b of the hollow chamber 60 through the second passage.

As such, the shock absorber 50 reduces the damping force by causing the fluid to flow into or from the upper chamber 60a or the lower chamber 60b of the hollow chamber 60 without passing through the piston valve 56 during the upward or downward movement of the free piston 62.

On the other hand, the actuator 74 is controlled by the controller 90. The controller 90 controls the operation of the actuator 74 according to a vertical acceleration of the vehicle measured by the acceleration sensor 80. Here, the actuator 74 is configured to adjust the length or position of the control rod 72 by actuating the control rod 72 to induce linear movement or rotation.

The acceleration sensor 80 may be disposed at one side of the cylinder 52 of the shock absorber 50 or at a wheel side of the vehicle. Here, the acceleration sensor 80 may be provided to each of the shock absorbers 50 or each of the wheels. Alternatively, the acceleration sensor 80 may be provided to one of the shock absorbers 50 or one of the wheels. Alternatively, the acceleration sensor 80 may be provided to a different location to measure the vertical acceleration of the vehicle.

Next, an operation of the controller 90 for controlling the variable part 70 will be described.

When the acceleration of the vehicle measured by the sensor 80 is high, the controller 90 controls the actuator 74 to lower the control rod 72. As the control rod 72 is lowered, a space for movement of the free piston 62 is decreased. Accordingly, the shock absorber 50 has a narrow region where the damping force is reduced, so that the shock absorber 50 can easily control the vehicle.

On the other hand, when the acceleration of the vehicle measured by the sensor 80 is low, the controller 90 controls the actuator 74 to raise the control rod 72. As the control rod 72 is raised, the space for movement of the free piston 62 is increased. Accordingly, the shock absorber 50 can decrease the damping force during the upward or downward movement of the free piston 62, thereby significantly improving the driving comfort of the vehicle.

In this manner, the controller 90 can restrict the range of motion of the free piston by the operation of the actuator 74, thereby controlling a variable degree of the damping force.

Figure 5:
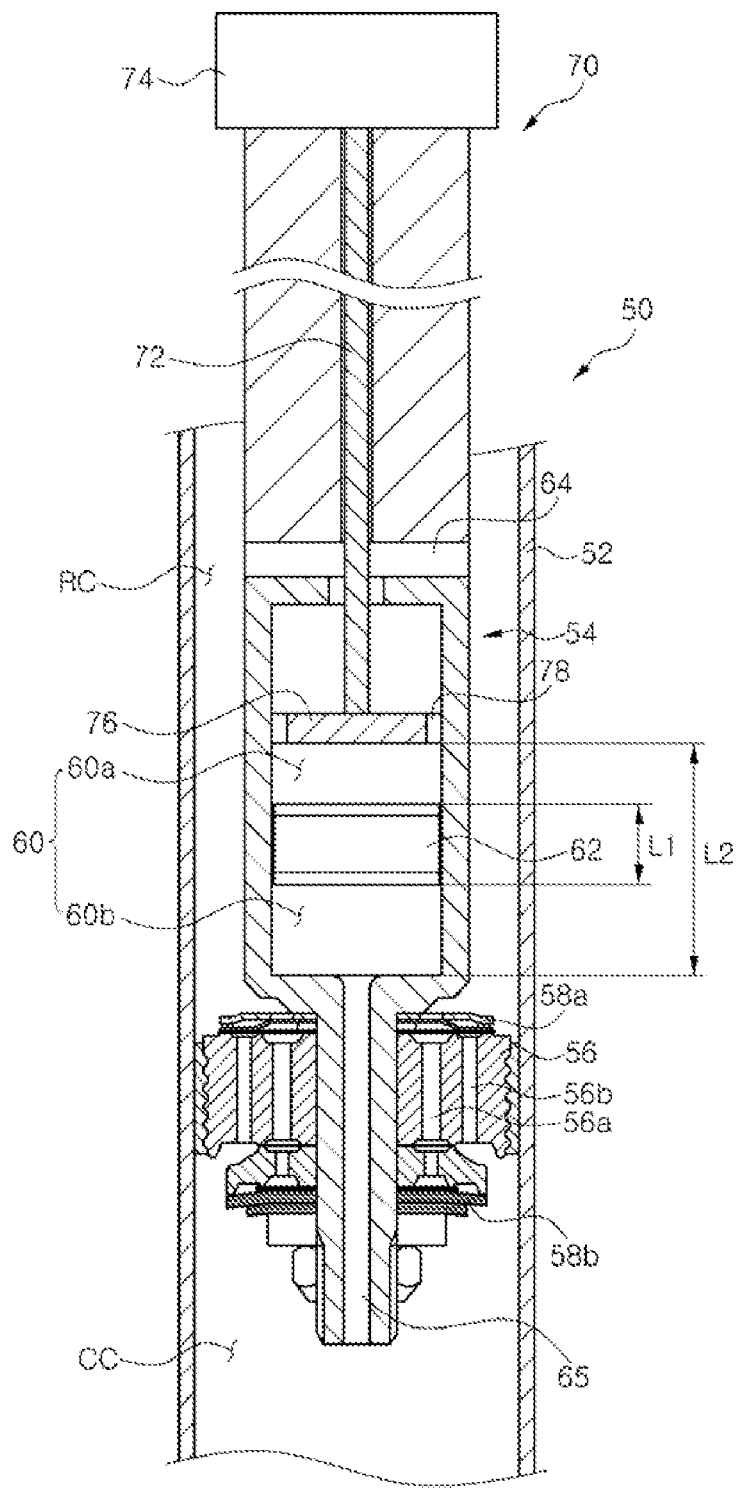
FIGS. 5 and 6 are cross-sectional views illustrating an operating state of the shock absorber of FIG. 4.
Figure 6:
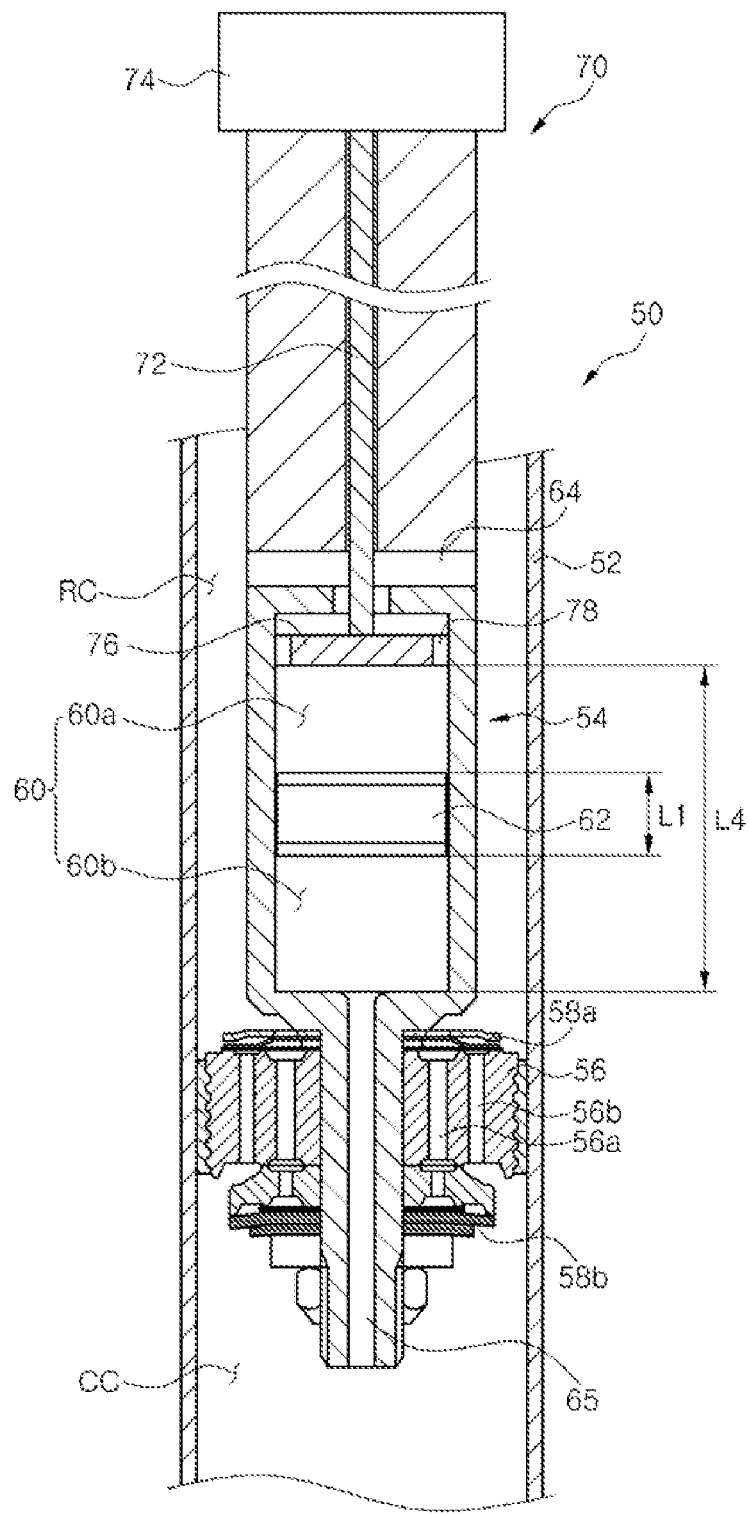

FIGS. 5 and 6 are cross-sectional views illustrating an operating state of the shock absorber according to one embodiment.

First, in FIG. 5, the variable part 70 of the shock absorber 50 is controlled to decrease the range of motion of the free piston 62. Here, the free piston 62 has a thickness L1 and can move a distance L2. In other words, the free piston 62 has a stroke distance S1 of L2-L1, which is the range of motion of the free piston 62.

When the piston rod 54 is slightly displaced, that is, when the free piston 62 moves within the stroke distance S1, the operating fluid moves into or from the hollow chamber 60 through the through-hole 64 and the shaft hole 65, so that the damping force characteristics of the shock absorber 50 are maintained at a low level.

When the piston rod 54 is largely displaced, that is, when the free piston 62 moves from the upper end of the hollow chamber 60 to the lower end thereof or vice versa, the operating fluid moves between the rebound chamber RC and the compression chamber CC through the piston valve 56, so that the damping force characteristics of the shock absorber 50 are maintained at a high level.

Further, in FIG. 6, the variable part 70 of the shock absorber 50 moves the control rod 72 upward so as to increase the range of motion of the free piston 62. Here, the free piston 62 has a thickness L1 and can move a distance L4. In other words, the free piston 62 has a stroke distance S2 of L4-L1, which is the range of motion of the free piston 62.

Figure 7:
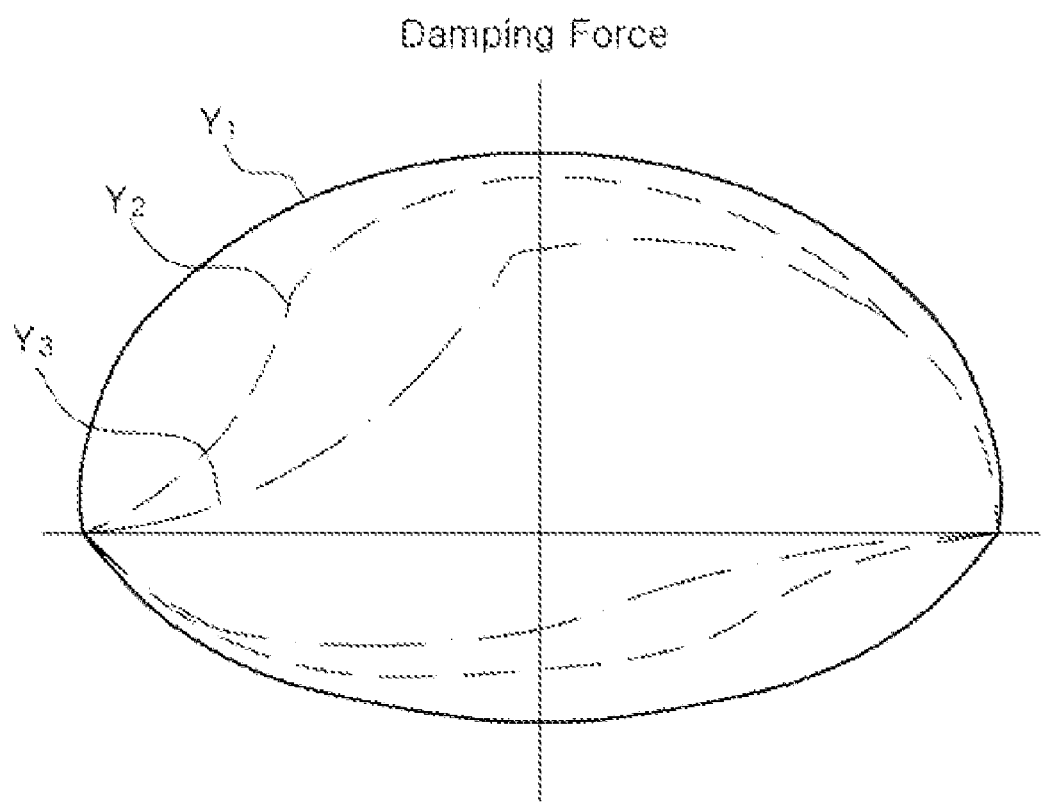
FIG. 7 is a plot of a damping force of the shock absorber of FIG. 4.

Accordingly, when the stroke distance S2 is set greater than the stroke distance S1 by the upward movement of the control rod 72, the damping force characteristics of the shock absorber 50 are varied as shown in FIG. 7.

Figure 1:
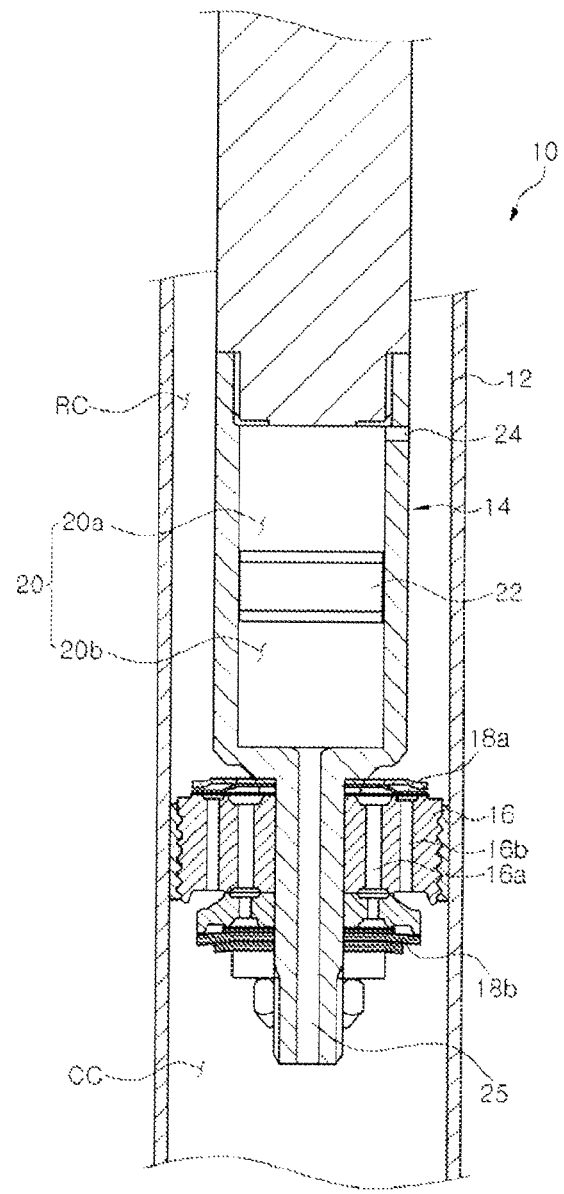
FIG. 1 is a partial cross-sectional view of a conventional shock absorber.
Figure 2:
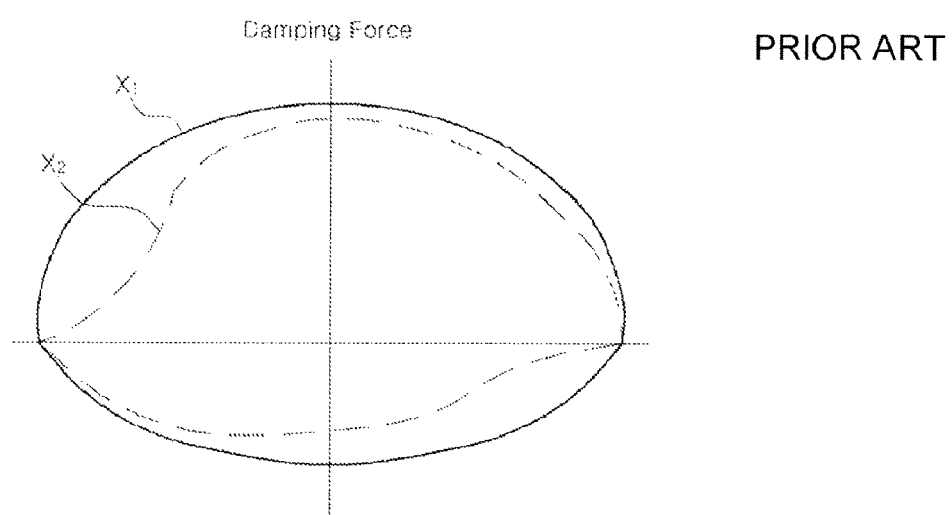
FIG. 2 is a plot of a damping force of the conventional shock absorber of FIG. 1.

FIG. 7 is a plot of a variable damping force of the shock absorber by a displacement of the piston rod according to the first embodiment. Referring to FIG. 7, assuming a movable length of the free piston is 0 when the control rod 72 of the variable part 70 is lowered as much as possible, a variable damping force is indicated by Y1. At this time, the variable damping force Y1 is the same as a variable damping force X1 (see FIG. 2), which can be obtained by the conventional shock absorber incapable of controlling the damping force characteristics.

When the control rod 72 is raised by the controller 90 to increase the range of motion of the free piston 62, the variable damping force can be indicated by Y2 or Y3. When the free piston 62 moves within the relatively small stroke distance S1 as shown in FIG. 5, the variable damping force can be indicated by Y2. On the other hand, when the free piston 62 moves within the relatively large stroke distance S2 as shown in FIG. 6, the variable damping force can be indicated by Y3.

Next, a shock absorber according to another embodiment will be described in detail with reference to FIG. 8.

Figure 8:
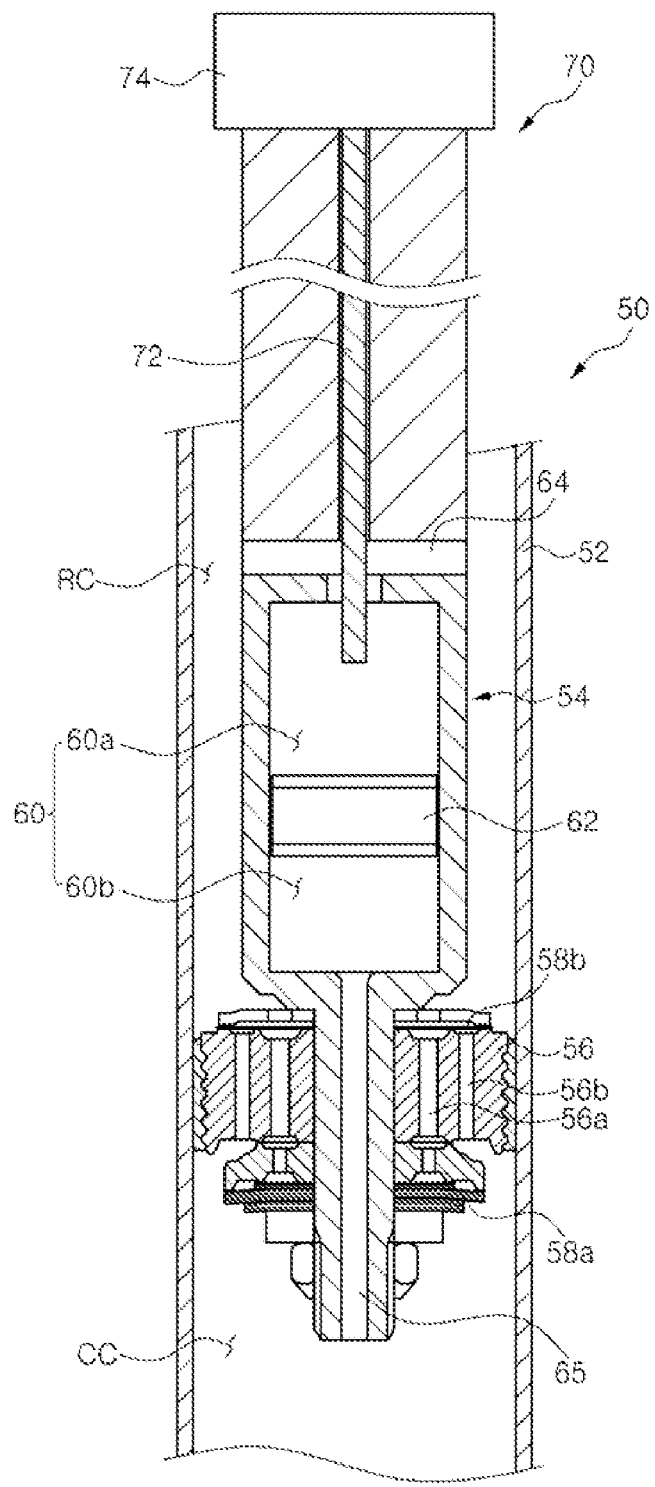
FIG. 8 is a partial cross-sectional view of a shock absorber according to another embodiment.

FIG. 8 is a partial cross-sectional view of the shock absorber according to another embodiment. The shock absorber does not employ the control valve 76 that is disposed at the distal end of the control rod 72 of the shock absorber according to the embodiment discussed above.

Although the control valve 76 is not employed, the range of motion of the free piston 62 can be controlled by the control rod 72, so that the shock absorber provides the same effects as those of the embodiment discussed above. Other configurations of the shock absorber are the same as those of the embodiment above, and thus, a detailed description thereof will be omitted herein.

As apparent from the above description, the shock absorber according to embodiments the present invention can electronically control the damping force characteristics according to the driving condition of the vehicle or the road state, so that the damping force characteristics can be varied according to the displacement of the piston rod. As such, embodiments of the present invention can improve driving comfort and stability of the vehicle by controlling the damping force characteristics of the shock absorber as necessary.

Although the present invention has been described with reference to the embodiments and the accompanying drawings, it should be noted that the present invention is not limited to the aforementioned embodiments, and that various modifications and equivalent embodiments can be made without departing from the spirit and scope of the present invention as defined only by the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A shock absorber capable of controlling damping force characteristics, comprising:

a cylinder filled with an operating fluid;

a piston valve disposed inside the cylinder to divide an interior of the cylinder into a first chamber and a second chamber;

a piston rod having one end extending outside the cylinder and one end coupled to the piston valve inside the cylinder;

a hollow chamber formed inside the piston rod and in fluid communication with the first and second chambers;

a free piston disposed within the hollow chamber configured to move axially and to divide the hollow chamber into upper and lower chambers;

a variable part having a valve member positioned within the hollow chamber and configured to control the damping force characteristics by adjusting an axial range of motion of the free piston; and an actuator wherein the variable part comprises a control rod having first and second ends, the first end movably positioned in the hollow chamber to control a range of motion of the free piston, the actuator being configured to axially move the control rod.

2. The shock absorber according to claim 1 wherein the upper chamber fluidly communicates with the first chamber through a through-hole formed toward an upper region of the hollow chamber, and the lower chamber fluidly communicates with the second chamber through a shaft hole formed toward a lower region of the hollow chamber.

3. The shock absorber according to claim 1 wherein the variable part further comprises a control valve provided to a distal end of the control rod and moving axially along with the control rod while contacting an inner circumferential surface of the hollow chamber.

4. The shock absorber according to claim 3 wherein the control valve is formed with a bypass passage through which upper and lower portions of the control valve fluidly communicate with each other.

5. A suspension system for buffering vibration transmitted from a road to a vehicle body through wheels during driving on the road, comprising:

a shock absorber including a hollow chamber formed inside a piston rod, a free piston disposed within the hollow chamber and configured to move axially in the hollow chamber and to divide the hollow chamber into upper and lower chambers, and a variable part configured to change the damping force characteristics by controlling an axial range of motion of the free piston;

a sensor for detecting a state of the road; and a controller configured to move the variable part of the shock absorber based on a measurement value of the sensor, wherein the sensor is an acceleration sensor mounted proximate a cylinder side of the shock absorber or proximate a wheel side.

6. The suspension system according to claim 5 wherein the controller controls the variable part to reduce a displacement of the free piston if a measurement value of the sensor is higher than a desired value and to increase the displacement of the free piston if the measurement value of the sensor is lower than the desired value.

* * * * *